United States Patent [19]
Havermans et al.

[11] Patent Number: 5,418,838
[45] Date of Patent: May 23, 1995

[54] COMMUNICATIONS SYSTEM, SWITCHING EXCHANGE AND LINE CARD

[75] Inventors: Gerardus M. J. Havermans; Joannes P. M. Van Kleef, both of Hilversum, Netherlands

[73] Assignee: U.S. Philips Corporation, New York, N.Y.

[21] Appl. No.: 143,267

[22] Filed: Oct. 26, 1993

[30] Foreign Application Priority Data

Oct. 26, 1992 [EP]  European Pat. Off. ......... 92203275.0

[51] Int. Cl.[6] ............................................. H04M 11/00
[52] U.S. Cl. .......................................... 379/60; 379/59; 455/33.2
[58] Field of Search ................. 379/58, 59, 60, 63; 455/33.1, 33.2, 54.1, 54.2, 53.1

[56] References Cited

FOREIGN PATENT DOCUMENTS 0473355  3/1992  European Pat. Off. .
0479477  4/1992  European Pat. Off. .

OTHER PUBLICATIONS

"Base Station Networking in Personal Communications", IEEE, 1991, pp. 1912–1916.
"Struktur des DECT-Standards", Nachrichtentech., Elektron., Berlin 42, 1992, pp. 23–29.
W. H. W. Tuttlebee (Ed.). "Cordless Telecommunications in Europe", Springer-Verlag, 1990, pp. 274.

*Primary Examiner*—Curtis Kuntz
*Assistant Examiner*—Michael B. Chernoff
*Attorney, Agent, or Firm*—Leroy Eason

[57] ABSTRACT

A cordless telephony system includes a switching exchange having a conventional switch which may be coupled to the public network. To avoid loading of such switch, the exchange also includes a backbone coupling network coupled to cluster controllers for respective clusters of base stations. Such network transports data between the cluster controllers during handover of a roaming mobile telephone set between different base stations. The system may be used as a private branch exchange operating with a central controller. The cluster controllers may be in the form of line cards which communicate with each other via the backbone coupling network, control being effected in a decentralized mode.

4 Claims, 4 Drawing Sheets

COMMUNICATIONS SYSTEM, SWITCHING EXCHANGE AND LINE CARD

The invention relates to a cordless telephony system comprising at least one switching exchange coupled to a plurality of cluster controllers by which clusters of base stations are coupled for radio communication with mobile transceiver stations.

The invention further relates to a such a system comprising a plurality of line cards which permit coupling to clusters of subscriber sets.

The invention likewise relates to a switching exchange coupled to a plurality of cluster controllers by which clusters of base stations can be coupled for radio communication with mobile transceiver stations.

The invention further relates to a line card.

A cordless telephony system of this type may be a digital system according to the commonly termed Digital European Cordless Telephone (DECT) DECT standard, in which the group controllers are DECT Cluster Controllers and the base stations are Radio Fixed Parts, but may also be a different communications system in which mobile stations communicate with fixed stations. The switching exchange may be a private branch exchange (Private Automatic Branch Exchange PABX) but also a rural concentrator, a public switch or concentrator.

DESCRIPTION OF THE RELATED ART

A cordless telephone system of this type is known from the handbook "Cordless Telecommunications in Europe", by W.H. Tuttlebee, Springer-Verlag, 1990, page 274. Such a system as described on page 274 in Appendix 3 of said handbook, in which a description of DECT is given, which comprises a private branch exchange, or PABX, as a switching exchange which comprises an extension for cordless telephony for realising calls with mobile stations via base stations in one or more cells. The handbook states that the extension is then to support, for example, a commonly termed call handover function. In addition to mobile stations, such a system may also comprise fixed stations such as business telephones, PCs and so on. No further details are given with respect to the extension and functions such as handover and it is to be assumed that the extension, with regard to said Appendix 3, comprises a plurality of DECT cluster controllers and the handover function is performed via the PABX. In an extensive radio telephony system having a large traffic density, a central controller in the PABX will be heavily loaded when functions such as handover are to be carried out. As a result, the capacity of the PABX will diminish and hence the price per line rises considerably.

SUMMARY OF THE INVENTION

It is an object of the invention to provide a radio telephony system to which said disadvantages are not attached.

A cordless telephony system according to the invention is characterized, in that the cluster controllers are intercoupled by a backbone coupling network. This provides that in a highly efficient manner, for example, roaming of a mobile transceiver station with associated handover function can be supported without central controllers, which primarily control call switching, being loaded. The backbone coupling network may also be used for exchanging signalling and control messages and for communication among cluster controllers. The backbone coupling network may then also support the switch function of the switching exchange for calls to and from mobile transceiver stations and is therefore to be considered a switch shared by the cluster controllers, with all the information arriving at a cluster controller–from a PCM switch or from base stations or RFPs (Radio Fixed Pans)–being transferred to the backbone coupling network. In this fashion commonly termed point-to-point and point-to-multipoint connections may be simply realised. The communications system may be a system based on the DECT standard (Digital European Cordless Telecommunications), which may have a microcellular structure, for example, within a business. Various private branch exchanges coupled to the public network may act as switching exchanges and roaming and handover functions within the business is possible by call routing of mobile transceiver stations to and from a fixed point of attachment to the switching exchange. The backbone coupling network leads to a modular system which is flexible as regards system extensions.

A simple embodiment of a cordless telephony system according to the invention is characterized in that the backbone coupling network comprises at least one communication path for exchanging speech and/or messages between the cluster controllers. The most simple embodiment, in which the communication path consists of at least one bus, provides a modular system structure supporting, for example, DECT handover functions of mobile transceiver stations between line cards. The system may be simply and flexibly adjusted to a given traffic volume in terms of numbers of users and to covering a larger area by simply linking up additional switching exchanges and/or cluster controllers to the one communication path.

A further embodiment of a cordless telephony system according to the invention is characterized, in that the at least one communication path comprises at least one primary backbone bus by which groups of cluster controllers are coupled and at least one secondary backbone bus which is coupled to the primary backbone bus. Consequently, a large number of cluster controllers may be coupled in modular fashion. Such a structure may be considered a hi-hierarchical structure. According to the same principle this structure may be expanded to a structure having more than two hierarchies.

A further embodiment of a cordless telephony system according to the invention is characterized, in that the cluster controllers comprise backbone switches coupled to the backbone coupling network for information routing to the at least one switching exchange and/or the fixed transceiver stations. The backbone switches provide a uniform coupling of the cluster controllers and the switching exchanges to the backbone bus structure.

A further embodiment of a cordless telephony system according to the invention is characterized in that the backbone switches provide speech transfer in the synchronous mode and message transfer in the asynchronous or synchronous mode. As a result, a highly flexible switching network is obtained which may be controlled decentrally i.e. from line card to line card. The backbone coupling network may be used for frame switching, cell switching and circuit switching.

The backbone coupling network may especially be used for handovers of connections between mobile transceiver stations, for which purpose the communications system is characterized in that a communication which is in progress between a cluster controller and a mobile transceiver station when the mobile transceiver station roams from one cluster controller to another cluster controller is transferred to the other cluster controller via the backbone coupling network.

A special embodiment of a radio telephony system according to the invention is characterized in that the cluster controllers and the backbone coupling network form part of the switching exchange. The switching exchange according to the invention is then a conventional private branch exchange comprising a conventional switch, extended by cluster controllers in the form of, for example, DCC line cards (DECT Cluster Controller) for coupling to base stations, and having a backbone bus structure, that is to say, on the basis of an existing PABX structure a modular and flexible extension to a PABX is effected which supports cordless telephony.

An embodiment of a radio telephony system according to the invention is characterized in that the cluster controllers are DECT cluster controllers in which DECT multiframe timing is distributed via the backbone coupling network. This achieves that all the DECT radio cells are synchronized and, therefore, do not disturb one another.

Another embodiment of a radio telephony system according to the invention is characterized, in that the line cards comprise backbone switches coupled to a backbone coupling network over which the line cards communicate with each other, speech being transferred in the synchronous mode and messages being transferred in the synchronous or asynchronous mode. As a result, a highly flexible decentrally controlled system is obtained which substitutes for prior-art private branch exchanges having a central controller, i.e. a system in which line cards are capable of communicating with one another without the intervention of a central controller.

BRIEF DESCRIPTION OF THE DRAWINGS

The invention will be further explained with reference to the drawings, in which.

DESCRIPTION OF THE PREFERRED EMBODIMENTS

Figure 1:
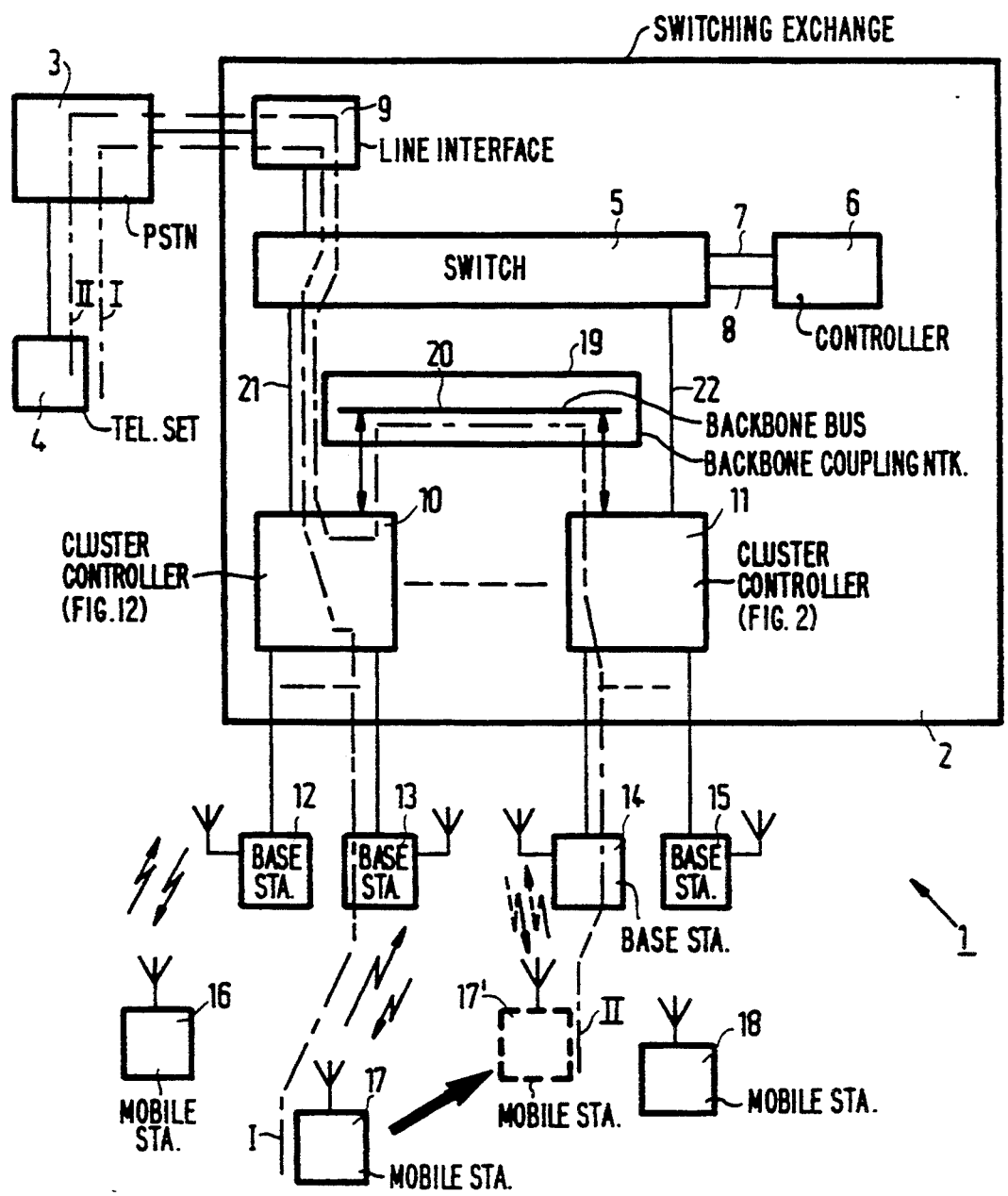
FIG. 1 schematically shows a radio telephony system according to the invention.

FIG. 1 schematically shows a radio telephony system 1 according to the invention, comprising a switching exchange 2 which may be coupled to a public network 3. Conventional telephone sets such as telephone set 4 or other conventional communications equipment may be coupled directly or via the public network 3 to the switching exchange 2. The switching exchange 2 comprises a conventional switch section, a switch 5 controlled by a controller 6 comprising a RAM and ROM 6. The controller 6 is coupled to switch 5 via a control bus 7 and a data bus 8. The conventional switch 5 may be digital switch, of an ISDN type (Integrated Services Digital Networks) which supports a Primary Rate Access of 30 B-channels and 1 D-channel. The B-channels may comprise PCM-speech or, alternatively, transparent data. The switch 5 is coupled to the telephone set 4 via a line interface 9 either or not via the public network 3, which may be a PSTN network (Public Switched Telephone Network). According to the invention, a plurality of cluster controllers are coupled to switch 5. In FIG. 1 the cluster controllers 10 and 11 are represented by which clusters of base stations are coupled for radio communication with mobile transceiver stations. In FIG. 1 the base stations 12 and 13 are shown for the cluster controller 10 and the base stations 14 and 15 for the cluster controller 11. Furthermore, the mobile stations 16, 17 and 18 are shown which have a duplex link to the respective base stations 12, 13 and 15. Roaming of the mobile station 17 in the radio telephony system 1 is indicated by means of a broken line mobile station 17'. The mobile station 17 is first located within range of the base station 13 coupled to the cluster controller 10 and then comes within range of the base station 14 coupled to the cluster controller 11. If the mobile station 17 is assumed to have already built up a communication link with the conventional telephone set 4, a handover of this link will be necessary in that case. According to the invention, such a handover is effected completely without the intervention of switch 5, that is to say, via a backbone coupling network 19 which is coupled to all the cluster controllers. FIG. 1 shows a simple embodiment of a backbone coupling network comprising a backbone bus 20. Handover of the link between the telephone set 4 which has a fixed location on the switch 5 during the connection, and the mobile station 17 is effected over the backbone bus 20 from the cluster controller 10 to the cluster controller 11 is denoted by respective switching paths I and II. Communication over the backbone bus is effected at a considerably higher transmission rate than communication between the cluster controllers 10 and 11 and the base stations 12, 13, 14 and 15 and the switch 5. That is, the backbone bus 20 has a considerably higher bandwidth than the transmission paths 21 and 22 between the switch 5 and the cluster controllers 10 and 11. In an ISDN structure of the switch 5 the transmission paths 21 and 22 may be Primary Rate Access channels, which for Europe is according to the commonly termed ISDN standard for 30B+D multiplexed ISDN channels. Cluster controllers 10 and 11 may then be considered to be in the form of DECT line cards. In addition to the handover function being carried out directly via the backbone coupling network 19, such network may also be used to advantage for different kinds of communication, e.g. speech traffic and message traffic. FIG. 1 shows the cluster controllers 10 and 11 and the backbone coupling network 19 as parts of the switching exchange 2, but these extensions of a conventional private branch exchange into a switching exchange may also be separate system components.

Figure 2:
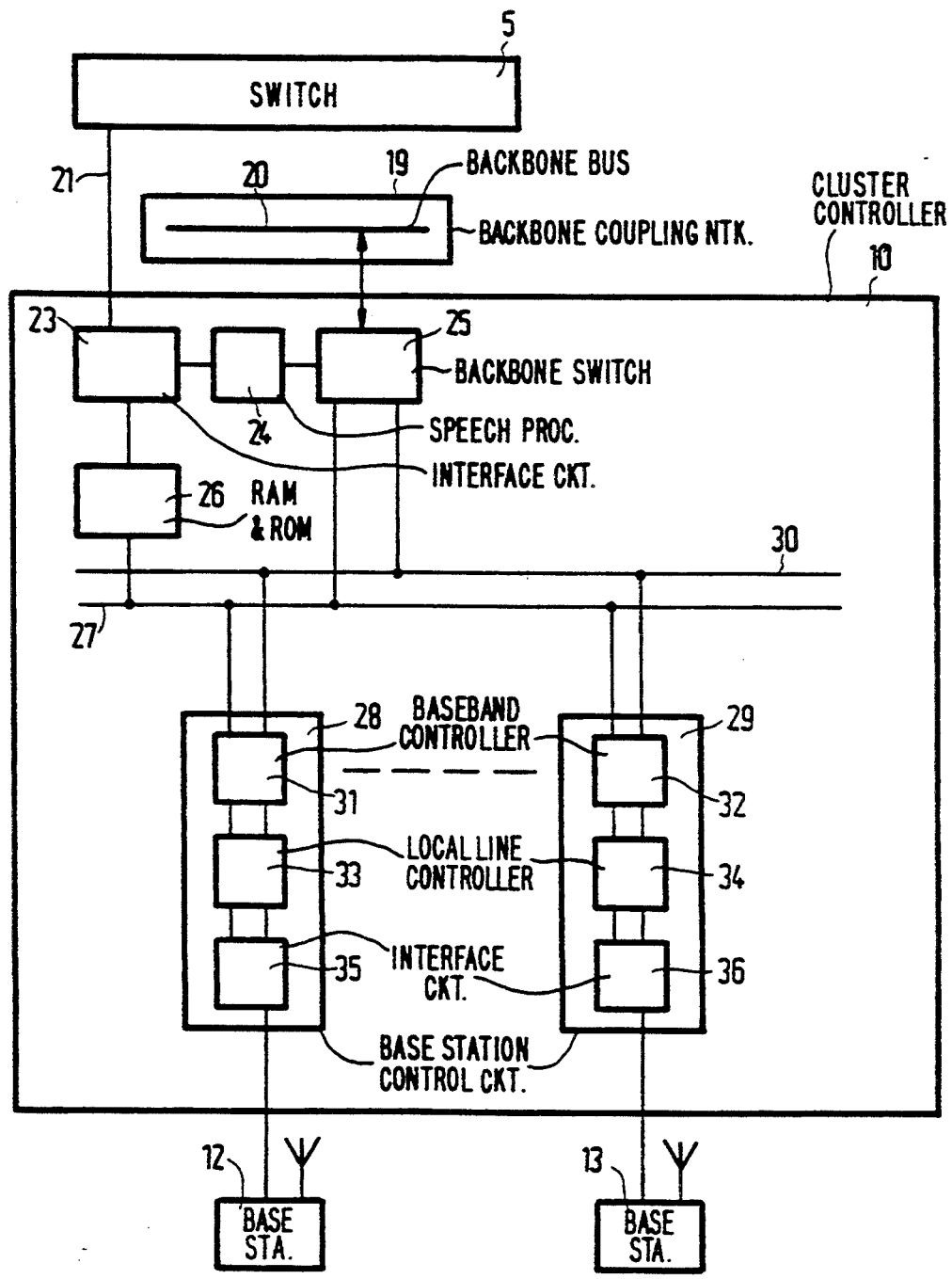
FIG. 2 shows a cluster controller for a radio telephony system according to the invention.

FIG. 2 shows a cluster controller for a cordless telephony system 1 according to the invention and system components corresponding to those shown in FIG. 1 are denoted by like reference characters. The cluster controller 10 comprises a system interface circuit 23 for coupling the cluster controller 10 to switch 5, which circuit is further coupled to a backbone switch 25 via a speech processor 24. The backbone switch 25, which is also coupled to the backbone bus 20, provides a mutual coupling of cluster controllers via the backbone bus 20 and the coupling of the cluster controllers to the switch 5. Furthermore, the cluster controller 10 comprises a RAM and ROM memory 26 coupled, on the one hand, to the system interface circuit 23 and, on the other hand, to a microcomputer bus 27. A microcomputer (not shown) coupled to the microcomputer bus 27 controls various system components in the cluster controller 10, such as the backbone switch 25, the RAM and ROM memory 26, the control circuits 28 and 29 for controlling the base stations 12 and 13. The backbone swish 25 is coupled to a transmission link 30 to which are also coupled the control circuits 28 and 29. The transmission link 30 is also capable of transporting 30 or 60 ADPCM channels at a 2 Mbit/sec transmission rate. The cordless telephony system 1 may operate on the basis of FDMA, TDMA, CDMA and TDD, or a combination or selection thereof. The control circuits 28 and 29 comprise baseband controllers 31 and 32, local line controllers 33 and 34 and transceiver interface circuits 35 and 36 respectively.

Figure 3:
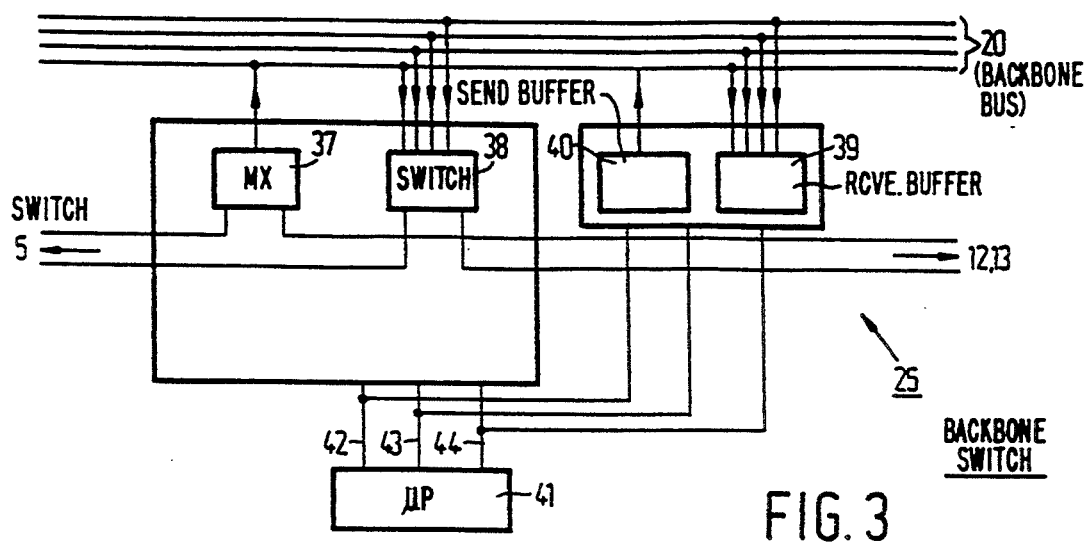
FIG. 3 shows a backbone switch in a radio telephony system according to the invention.

FIG. 3, which comprises elements designated by reference characters corresponding to those of FIGS. 1 and 2, gives a more detailed representation of a backbone switch 25 in a system according to the invention, coupled to the backbone bus 20. The backbone switch 25 comprises a multiplex circuit 37 and a switch 38 for transferring all the ADPCM time slots from the cluster controller 10 to the backbone bus 20, and for transferring specific time slots from the backbone bus 20 to the cluster controller 10 respectively. For mutually transferring ATM (Asynchronous Transfer Mode) messages among cluster controllers via the backbone bus 20, the backbone switch 25 an ATM receiving buffers 39 and an ATM sending buffer 40. For control purposes there is a microprocessor 41 comprising a memory, which is coupled to the backbone switch 25 by means of an address bus 42, a data bus 43 and a control bus 44. All the ATM traffic then completely bypasses switch 5. The backbone switch 25 thus supports two 2 Mbit/sec transmission paths and one ATM channel and comprises four 20 Mbit/sec backbone receiving interfaces and one sending interface and, furthermore, a microprocessor bus.

Figure 4:
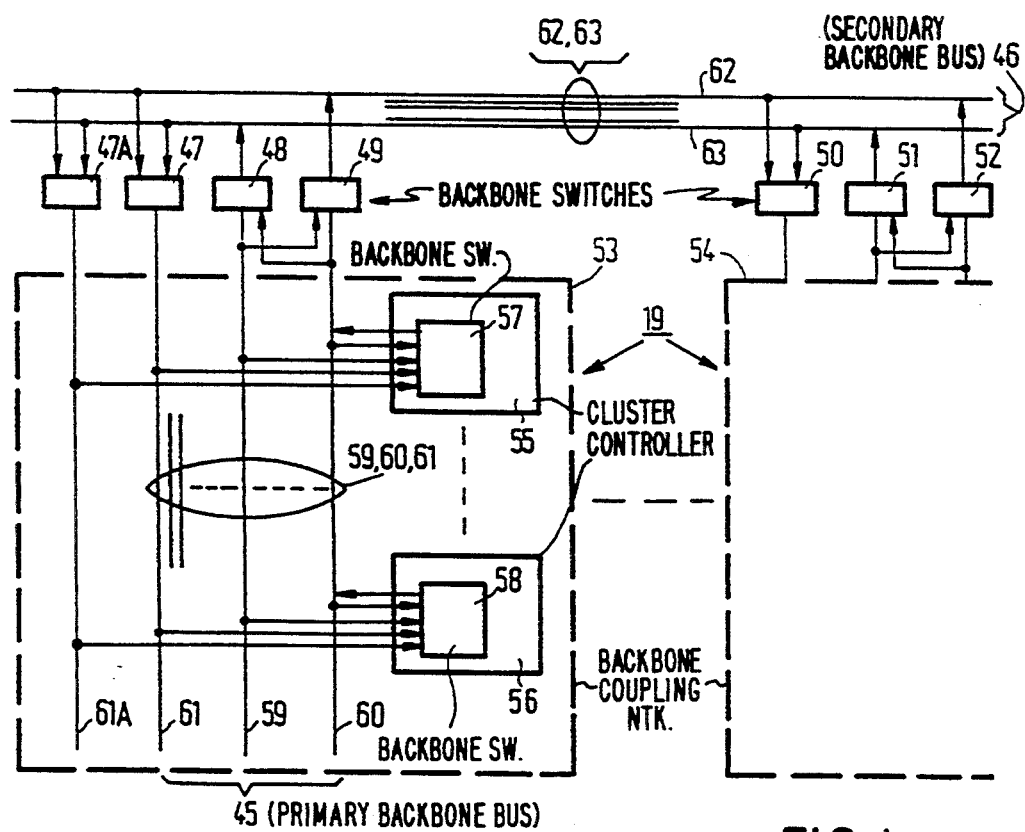
FIG. 4 shows a structure of a backbone coupling network comprising primary and secondary backbone buses according to the invention.

In FIG. 4 a structure is shown of a backbone coupling network 19 according to the invention, comprising a primary backbone bus 45 and a secondary backbone bus 46. To the primary backbone bus 45 may be connected, for example, a maximum of 16 cluster controllers, whereas a maximum of 4 groups of 16 cluster controllers can be connected to the secondary backbone bus 46. The cluster controllers are intercoupled via backbone switches as described with reference to FIG. 3, over the buses 45 and 46. FIG. 4 represents backbone switches 47 to 52 and 47A for coupling a group 53 and a group 54 of cluster controllers to the secondary bus 46. In the group 53 the cluster controllers 55 and 56 comprising the backbone switches 57 and 58 are shown. Such a structure is modular and highly flexible with respect to system extensions. With 4 groups of 16 cluster controllers having 80 connections per cluster controller the capacity of the backbone coupling network 19 is about 4×16×80=5,120 connections. The primary bus 45 comprises a pair of sub-buses 59 and 60 for transporting information from the primary bus 45 to the secondary bus 46 and a pair of sub-buses 61 and 61A for transporting information from the secondary bus 46 to the primary bus 45. For reasons of error tolerance the secondary bus 46 comprises at least two sub-buses 62 and 63. In addition to the described bus structure comprising two hierarchical levels it is alternatively possible to realise a structure comprising an even larger number of hierarchical levels.

Figure 5:
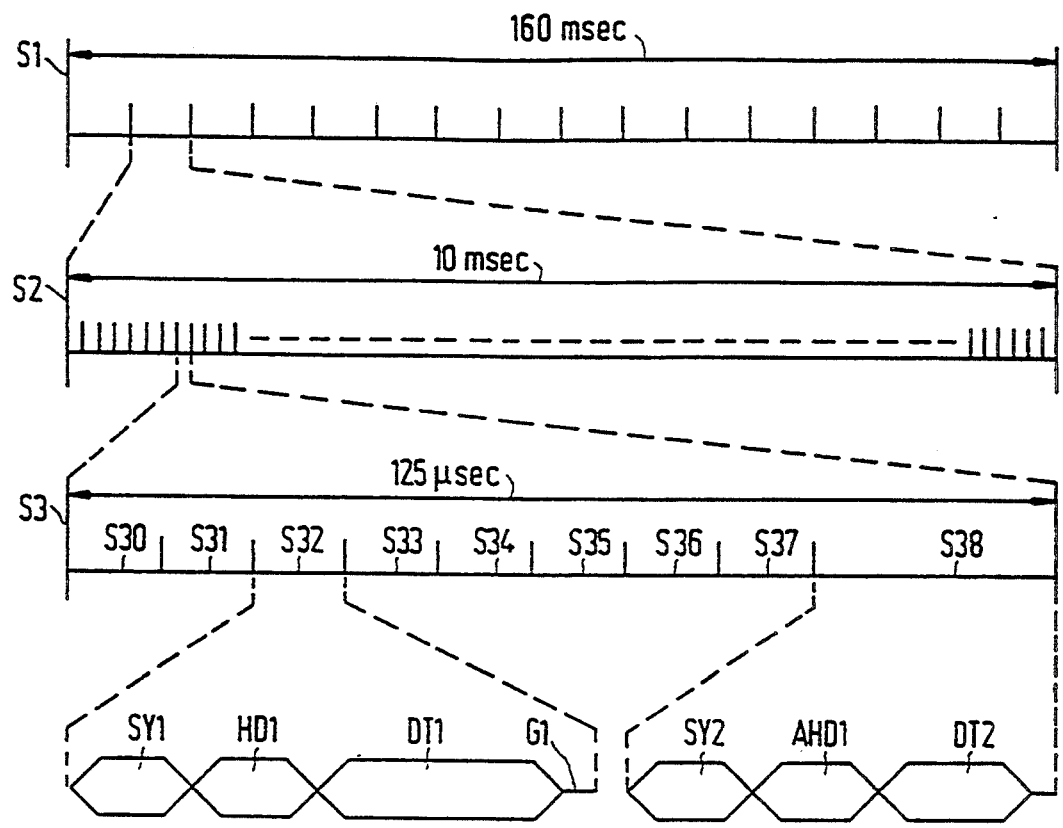
FIG. 5 shows timing of and signals on the backbone bus according to the invention.

FIG. 5 shows timing of and signals on the backbone bus 20 according to the invention. A multiframe signal S1 is shown of 160 msec, which comprises 16 10 μsec frames S2 having 80 125 μsec subframes S3, comprising 8 synchronous slots S30 to S37 of 32 data octets and one ATM slot or A-slot S38 of 4 octets header/CRC+48 data octets. The synchronous or S slots S30 to S37 comprise a sync pattern SY1, a common backbone header HD1 of 3 bits and 32 data octets DT1, followed by a guard time G1, and the A-slot 38 comprises a sync pattern SY2, an ATM backbone header AHD 1 and 4+48 data octets DT2. Thus there are sub-frames S3 which comprise 8 synchronous 2 Mbit/sec channels with the same structure as a customary 2 Mbit PCM channel or which may also be used for frame switching, and a single 3.5 Mbit/sec ATM channel, for message transfer starting from a maximum bit rate of 20 MHz. Since the PCM frame sync signal forms part of the frame and the overall frame length is 125 μsec, the backbone frames are synchronous and in phase with the 2 Mbit ISDN fines. A request for the ATM channel is made via a bit in the header HD1 of the synchronous channel. The remaining bandwidth is for other sync patterns and the like. Data transport is thus effected with a relatively high bit rate and without utilizing a separate clock signal. In the common backbone header HD 1 the access is arranged for dynamically multiplexed frame switching connections.

Figure 6:
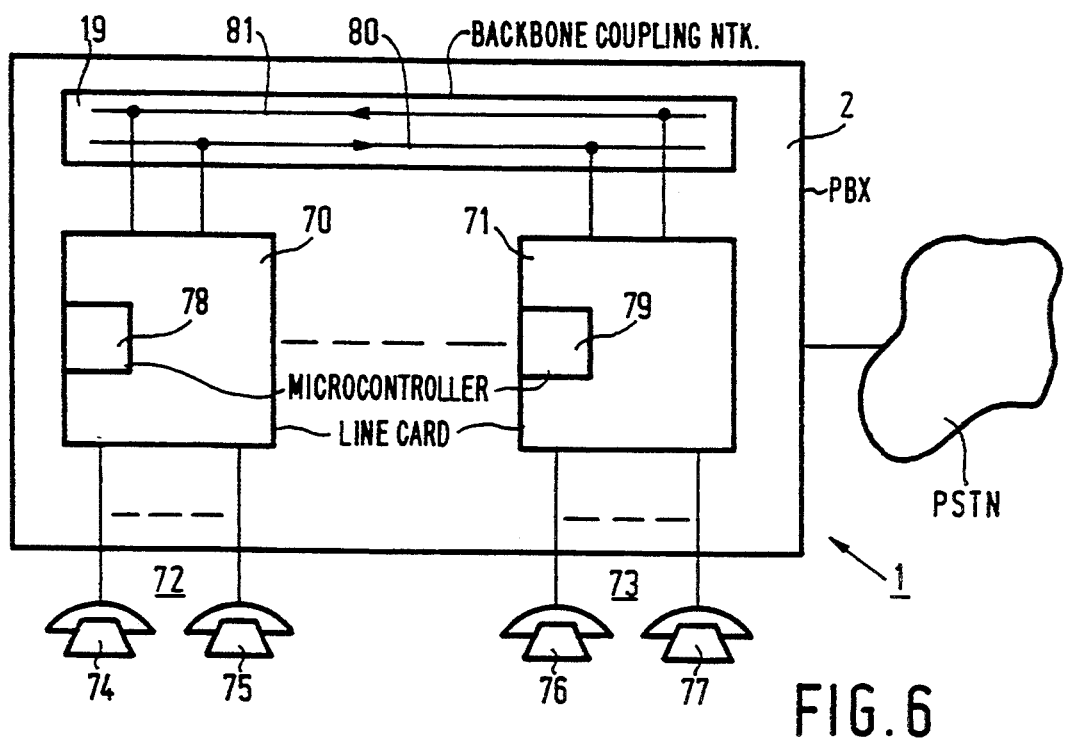
FIG. 6 shows a further embodiment of a radio telephony system according to the invention.

FIG. 6 shows a further embodiment of a cordless telephony system 1 according to the invention, in which the private branch exchange 2 comprises a plurality of line cards 70 and 71 coupled to the backbone coupling network 19 which has already been extensively described with respect to the previous embodiment. The line cards 70 and 71 are coupled to clusters 72 and 73 of subscriber sets 74, 75, 76 and 77. Furthermore, the public network (PSTN) may be incorporated in the communications system 1. The line cards 70 and 71 further include a microcontroller 78 and 79 respectively, for decentralized control of the cordless telephony system 1. There is further a central controller (not shown). The backbone coupling network 19 together with the decentralized controller takes the pan of a centrally controllable conventional switching arrangement in a private branch exchange by means of microcontrollers 78 and 79. The line cards 70 and 71 may thus decentrally communicate with each other without the intermediary of a central controller. Communication over the backbone coupling network is effected in the synchronous mode for speech and in the asynchronous or synchronous mode for messages, as has been described in the foregoing. The communication among subscriber sets via the line cards cannot be blocked. For speech communication between, for example, the sets 75 and 76, set 75 having a call for set 76, the line card 70 has 32 synchronous transmission paths on the backbone coupling network 19 at its disposal. The address of the set 75 claims an up-path 80 on the network 19. The microcontroller 78 sends in the asynchronous mode an ATM message to the set 76 over the network 19 with the address of set 76. Then the microcontroller 78, belonging to the set 75 (the A subscriber), knows on which line card the set 76

(the B subscriber) is located. The set 76 then links up to the up-path 80 claimed by the set 75. In reverse order the microcontroller 79 then claims return path 81 in similar fashion. A connection to the public network PSTN may then be effected by means of a trunk card (not shown) coupled to the network 19.

We claim:

1. A switching exchange for use in a cordless telephony system for providing communication paths for exchange of speech and/or data between a plurality of base stations and between any of said base stations and an external telephone line, each base station providing a radio communication link with a mobile telephone set located in the vicinity of said base station; said switching exchange comprising:

a plurality of cluster controllers each coupled to a respective cluster of base stations, each cluster controller comprising a backbone switch controlled by a microprocessor;

switching means for coupling any of said cluster controllers to said external telephone line;

a backbone coupling network comprising a backbone bus which is coupled to the backbone switches of all of the cluster controllers, said backbone switches providing speech transfer in a synchronous operating mode and message transfer in a synchronous or asynchronous operating mode between said cluster controllers via said backbone bus;

said microprocessors being operative to control said backbone switches so that when a mobile telephone set roams from the vicinity of one of said clusters of base stations into the vicinity of another of said clusters of base stations, an existing communication link with said mobile telephone set via the cluster controller for said one cluster of base stations is handed over via said backbone coupling network to the cluster controller for said other cluster of base stations;

whereby said communication link is maintained via a base station in said other cluster without intervention by said switching means.

2. A switching exchange as claimed in claim 1, wherein said cluster controllers are DECT cluster controllers having multiframe timing distributed thereto by said backbone coupling network.

3. A switching exchange as claimed in claim 1, wherein said cluster controllers are in form of line cards.

4. A switching exchange as claimed in claim 2, wherein said cluster controllers are in the form of line cards.

* * * * *